United States Patent
Dai et al.

(10) Patent No.: US 10,341,291 B2
(45) Date of Patent: Jul. 2, 2019

(54) METHOD, EQUIPMENT, SYSTEM AND COMPUTER STORAGE MEDIUM FOR IMPLEMENTING NUMBER PORTABILITY ANNOUNCEMENT

(71) Applicant: ZTE CORPORATION, Guangdong (CN)

(72) Inventors: Zhigang Dai, Guangdong (CN); Zhisong Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 322 days.

(21) Appl. No.: 15/321,466

(22) PCT Filed: Oct. 17, 2014

(86) PCT No.: PCT/CN2014/088857
§ 371 (c)(1),
(2) Date: Dec. 22, 2016

(87) PCT Pub. No.: WO2015/196650
PCT Pub. Date: Dec. 30, 2015

(65) Prior Publication Data
US 2017/0180310 A1    Jun. 22, 2017

(30) Foreign Application Priority Data
Jun. 26, 2014 (CN) .......................... 2014 1 0302758

(51) Int. Cl.
*H04M 7/00* (2006.01)
*H04L 29/12* (2006.01)
(Continued)

(52) U.S. Cl.
CPC .......... *H04L 61/2084* (2013.01); *H04L 29/06* (2013.01); *H04L 45/745* (2013.01);
(Continued)

(58) Field of Classification Search
CPC ... H04L 61/2084; H04L 29/06; H04L 45/745; H04L 61/157; H04L 61/308;
(Continued)

(56) References Cited

U.S. PATENT DOCUMENTS 6,529,595 B1 *  3/2003  Medhat et al. .......... 379/221.13

FOREIGN PATENT DOCUMENTS

| CN | 1964394 | 5/2007 |
|---|---|---|
| CN | 101321324 | 12/2008 |

(Continued)

OTHER PUBLICATIONS

International Search Report for PCT/CN2014/088857 dated Mar. 25, 2015, 4 pages.

*Primary Examiner* — Rasha S Al Aubaidi
(74) *Attorney, Agent, or Firm* — Nixon & Vanderhye P.C.

(57) ABSTRACT

A method, a device and a storage medium for processing a communication service in a circuit switch domain are provided. The method may include: judging, when a communication service being currently processed by a communication terminal is a voice call service or a short message service in a circuit switch domain, whether a switching condition for switching the communication service onto a real-time communication tool in a packet switch domain of the communication terminal is met; if it is met, switching the communication service onto the real-time communication tool in the packet switch domain of the communication terminal.

20 Claims, 4 Drawing Sheets

(51) Int. Cl.
  *H04L 29/06* (2006.01)
  *H04L 12/741* (2013.01)
  *H04M 3/42* (2006.01)
  *H04M 7/12* (2006.01)
  *H04Q 3/00* (2006.01)
  *H04W 8/28* (2009.01)

(52) U.S. Cl.
  CPC .......... *H04L 61/157* (2013.01); *H04L 61/308* (2013.01); *H04L 61/3085* (2013.01); *H04L 65/1016* (2013.01); *H04L 65/1063* (2013.01); *H04L 65/1096* (2013.01); *H04M 3/42297* (2013.01); *H04M 7/129* (2013.01); *H04Q 3/005* (2013.01); *H04Q 2213/1305* (2013.01); *H04W 8/28* (2013.01)

(58) Field of Classification Search
  CPC ............. H04L 61/3085; H04L 65/1016; H04L 65/1063; H04L 65/1096; H04M 3/42297; H04M 7/129; H04Q 3/005
  USPC ..................................... 379/221.13
  See application file for complete search history.

(56) References Cited

FOREIGN PATENT DOCUMENTS

| | | |
|---|---|---|
| CN | 101640866 | 2/2010 |
| EP | 1 742 453 | 1/2007 |

\* cited by examiner

METHOD, EQUIPMENT, SYSTEM AND COMPUTER STORAGE MEDIUM FOR IMPLEMENTING NUMBER PORTABILITY ANNOUNCEMENT

This application is the U.S. national phase of International Application No. PCT/CN2014/088857 filed Oct. 17, 2014 which designated the U.S. and claims priority to CN Patent Application No. 201410302758.0 filed Jun. 26, 2014, the entire contents of each of which are hereby incorporated by reference.

TECHNICAL FIELD

The present disclosure relates to Internet Protocol Multimedia Subsystem (IP IMS) technologies, and in particular relates to a method, equipment, system and computer storage medium for implementing NP (Number Portability) announcement.

BACKGROUND

NP refers to that an telecom user still keeps an original telecom service number under the condition that the telecom user migrates from a permanent address or changes an operator. In other words, the NP requires that the user number remains unchanged permanently. In some regions, the NP, which is taken as a compulsive requirement of telecom supervision, is used for protecting the benefit of weak telecom operators; and part of operators further provide the NP inside an own network to meet the demands of the user who changes the permanent address, so as to reduce the churn rate.

The NP is mainly implemented in a network element that is a CSCF (Call Session Control Function) in the existing IMS network, and specifically, the CSCF acquires callee number information containing NP information of a callee number by an ENUMS (Telephone Number Mapping Server) query; and a calling is routed according to the callee number information. In this way, in a whole calling process, a network element of an IMS is only used for completing routing processing of the calling, and does not judge whether the callee number generates the NP and cannot announce an NP prompt tone to a caller, causing poor user experience.

At present, in order to implement the judgment whether the callee number generates the NP, the IMS network adopts an NP announcement manner as follows: an SCSCF (Serving-CSCF) triggers ENUM to execute an ENUM query to acquire callee number information, a calling, after the ENUM query, is routed to an NPA AS (Number Portability Announcement Application Server), and an NP indicating parameter is contained in a calling request; the NPA AS firstly checks whether a caller has an NP prompt tone announcement attribute after receiving the calling request; under the conditions that the caller has the prompt tone announcement attribute, and the calling request contains the NP indicating parameter, whether a callee generates the NP is judged according to the callee number information and local NP criteria; the NPA AS controls an MRFP (Media Resource Function Processor) to announce the NP prompt tone to the caller when the callee number generates the NP; and after the announcement is ended, the NPA AS sends the calling to the SCSCF, the SCSCF implements the routing of the calling according to route configuration, and the calling is routed to an MGCF (Media Gateway Control Function) for subsequent routing processing.

However, the above NPA manner has greater defects: 1) caller business information needs to be deployed at the NPA AS, and an NPA function can not be provided to a non-NPA AS user; 2) the SCSCF routes all callings to the NPA AS, thereby increasing the performance processing requirements of the SCSCF and the NPA AS to a certain extent; and 3) the requirements of the route configuration of the SCSCF are more complex, thereby being not conductive to subsequent operation and maintenance.

SUMMARY

Embodiments of the present invention provide a method, equipment, system and computer storage medium for implementing NPA, which can reduce dependence between network elements and performance effect on the network elements while effectively implementing the NPA.

Technical solutions of embodiments of the present invention are implemented as follows.

Embodiments of the present invention provide a method for implementing the NPA, including:
acquiring caller subscription information; and
sending a calling request according to IFC (Initial Filter Criteria) when the IFC of the caller subscription information contains trigger criteria for an NPA AS,
where the trigger criteria for the NPA AS includes: a trigger priority of the NPA AS is the lowest at a calling side.

Embodiments of the present invention further provide a method for implementing the NPA, including:
receiving a calling request;
triggering ENUM to execute an ENUM query and acquiring a query result;
judging whether a callee number generates NP according to the query result and acquiring a judgment result; and
sending an announcement instruction to an MRFP when the judgment result is that the callee number generates the NP, so as to enable the MRFP to announce an NP prompt tone to a caller according to the announcement instruction.

In one embodiment, the query result is that callee number information in the calling request is in an TEL URI (Telephone Uniform Resource Identifier) format;
the judging whether the callee number generates the NP according to the query result, includes: judging whether the callee number generates the NP according to the callee number information in the TEL URI format.

In one embodiment, the judging whether the callee number generates the NP according to the callee number information in the TEL URI format, includes: extracting a network routing code and a user number section in the callee number information in the TEL URI format; querying whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

In one embodiment, the query result is that the callee number information in the calling request is in an SIP URI (Session Initialization Protocol Uniform Resource Identifier) format; and
the judging whether the callee number generates the NP according to the query result, includes: judging whether the callee number generates the NP according to the callee number information in the SIP URI format.

In one embodiment, the judging whether the callee nummation in the SIP URI format, includes: extracting a network domain name and a user number section in the callee number information in the SIP URI format; querying whether the network domain name is consistent with a pre-configured network domain name corresponding to a user number section in a second corresponding relationship table according to the user number section; if not consistent, it is indicated that the callee number generates the NP; and if consistent, it is indicated that the callee number does not generate the NP.

In one embodiment, the method further includes: feeding back an error message to an SCSCF when the judgment result is that the callee number does not generate the NP.

Embodiments of the present invention provide an SCSCF, including: an acquisition module and a calling sending module, where the acquisition module is configured to acquire caller subscription information; and the calling sending module is configured to send a calling request according to an IFC when the IFC of the caller subscription information contains trigger criteria for an NPA AS, where the trigger criteria for the NPA AS includes: a trigger priority of the NPA AS is the lowest at the calling side.

Embodiments of the present invention provide an NPA AS, including: a calling receiving module, an execution module, a judgment processing module and a sending module, where the calling receiving module is configured to receive a calling request;

the execution module is configured to trigger ENUM to execute an ENUM query and acquire a query result;

the judgment processing module is configured to judge whether a callee number generates NP according to the query result and acquire a judgment result; and the sending module is configured to send an announcement instruction to an MRFP when the judgment result acquired by the judgment processing module is that the callee number generates the NP, so as to enable the MRFP to announce the NP prompt tone to the caller according to the announcement instruction.

In one embodiment, the query result is that the callee number information in the calling request is in an TEL URI format; and the judgment processing module is configured to judge whether the callee number generates the NP according to the callee number information in the TEL URI format.

In one embodiment, the judgment processing module includes a first extraction unit and a first query unit, where the first extraction unit is configured to extract a network routing code and a user number section in the callee number information in the TEL URI format; and the first query unit is configured to query whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

In one embodiment, the query result is that the callee number information in the calling request is in an SIP URI format; and the judgment processing module is configured to judge whether the callee number generates the NP according to the callee number information in the SIP URI format.

In one embodiment, the judgment processing module includes a second extraction unit and a second query unit, where the second extraction unit is configured to extract a network routing code and a user number section in the callee number information in the SIP URI format; and the second query unit is configured to query whether the network routing code is consistent with a pre-configured network routing code corresponding to a user number section in a first corresponding relationship table according to the user number section; if not consistent, it is indicated that the callee number generates the NP; and if consistent, it is indicated that the callee number does not generate the NP.

In one embodiment, the sending module is further configured to feed back an error message to an SCSCF when the judgment result acquired by the judgment processing module is that the callee number does not generate the NP.

Embodiments of the present invention further provide a system for implementing the NPA, including: the SCSCF, the NPA AS, the ENUMS and the MRFP, where the SCSCF is configured to acquire caller subscription information; and send a calling request to the NPA AS according to an IFC when the IFC of the caller subscription information contains trigger criteria for the NPA AS;

the NPA AS is configured to receive the calling request; trigger ENUM to execute an ENUM query and acquire a query result; judge whether a callee number generates NP according to the query result and acquire a judgment result; and send an announcement instruction to the MRFP when the judgment result is that the callee number generates the NP;

the ENUMS is configured to execute the ENUM query; and the MRFP is configured to receive the announcement instruction sent by the NPA AS; and announce the NP prompt tone to a caller according to the announcement instruction.

In one embodiment, the query result is that the callee number information in the calling request is in an TEL URI format; and the NPA AS is configured to judge whether the callee number generates the NP according to the callee number information in the TEL URI format.

In one embodiment, the NPA AS is configured to extract a network routing code and a user number section in the callee number information in the TEL URI format; and query whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

In one embodiment, the query result is that the callee number information in the calling request is in an SIP URI format; and the NPA AS is configured to judge whether the callee number generates the NP according to the callee number information in the SIP URI.

In one embodiment, the NPA AS is configured to extract a network domain name and a user number section in the callee number information in the SIP URI format; and query whether the network domain name is consistent with a pre-configured network domain name corresponding to a user number section in a second corresponding relationship table according to the user number section; if not consistent, it is indicated that the callee number generates the NP; and if consistent, it is indicated that the callee number does not generate the NP.

In one embodiment, the NPA AS is further configured to feed back an error message to the SCSCF when the judgment result is that the callee number does not generate the NP; and the SCSCF is further configured to continue subsequent calling flows after receiving the error message.

Embodiments of the present invention further provide a computer storage medium storing computer executable instructions for executing the NPA described in embodiments of the present invention.

According to the method, the equipment and the system for implementing the NPA and the computer storage medium provided by embodiments of the present invention, the SCSCF acquires the caller subscription information; the SCSCF sends the calling request to the NPA AS according to the IFC when the IFC of the caller subscription information contains the trigger criteria for the NPA AS; the NPA AS receives the calling request; ENUM is triggered to execute the ENUM query, and the query result is acquired; whether the callee number generates the NP is judged according to the query result, and the judgment result is acquired; the NPA AS sends the announcement instruction to the MRFP when the judgment result is that the callee number generates the NP; and the MRFP announces the NP prompt tone to the caller according to the announcement instruction. Therefore, the NPA AS triggers ENUM to execute the ENUM query and implements the judgment for the NP after the ENUM query, so as to reduce dependence between the network elements while effectively implementing the NPA.

Additionally, in embodiments of the present invention, the SCSCF triggers the NPA AS based on the IFC, rather than a full routing manner, thereby effectively reducing the performance processing requirements of the NPA AS and the SCSCF and the complexity of route configuration of the SCSCF; and meanwhile, the IFC is utilized for implementing an NPA attribute of the caller, so that the NPA AS does not need to deploy caller business information, so as to improve the system processing capacity of the NPA AS.

DETAILED DESCRIPTION

In embodiments of the present invention, an SCSCF acquires caller subscription information; the SCSCF sends a calling request to an NPA AS according to an IFC when the IFC of the caller subscription information contains trigger criteria for the NPA AS; the NPA AS receives the calling request; ENUM is triggered to execute an ENUM query, and a query result is acquired; whether a callee number generates NP is judged according to the query result, and a judgment result is acquired; the NPA AS sends an announcement instruction to an MRFP when the judgment result is that the callee number generates the NP; and the MRFP receives the announcement instruction sent by the NPA AS and announces an NP prompt tone to a caller according to the announcement instruction, where the query result includes: callee number information in the calling request is in an TEL URI format or in an SIP URI format; it should be noted that: in order to avoid the influence on business implementation of other ASs caused by transformation of the callee number information acquired after the NPA AS triggers ENUM to execute the ENUM query, the trigger criteria for the NPA AS contained in the IFC are required to include: the trigger priority of the NPA AS is the lowest at a calling side, i.e. at a calling network side, the NPA AS, which is taken as a last AS, is triggered by the SCSCF.

The present disclosure is further described below in detail in combination with drawings and specific embodiments.

Figure 1:
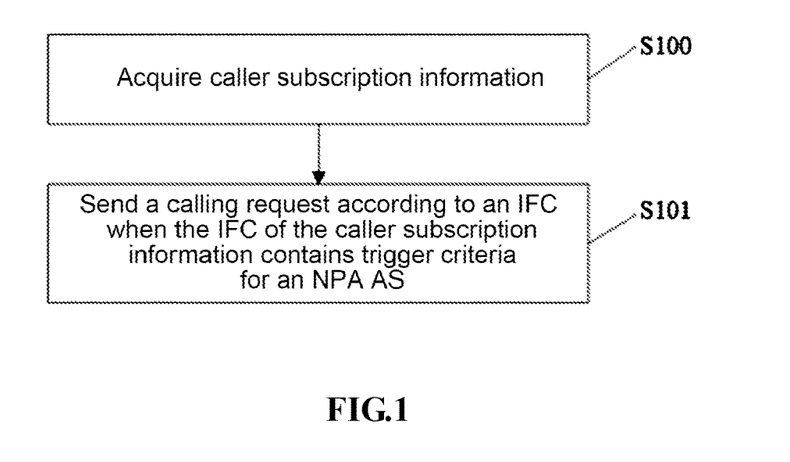
FIG. 1 is a flow chart illustrating a method for implementing NPA at an SCSCF side according to embodiments of the present invention.

FIG. 1 is a flow chart illustrating a method for implementing NPA at an SCSCF side according to embodiments of the present invention. As shown in FIG. 1, the method for implementing the NPA at the SCSCF side according to embodiments of the present invention includes:

S100: caller subscription information is acquired;

Here, an HSS (Home Subscriber Server) stores the caller subscription information; and accordingly, the acquiring the caller subscription information, includes: an SCSCF acquires the caller subscription information from the HSS by a Cx interface.

S101: a calling request is sent according to an IFC when the IFC of the caller subscription information contains trigger criteria for an NPA AS.

Here, the calling request refers to that the SCSCF sends the calling request to the NPA AS according to the IFC; and the trigger criteria for the NPA AS include: the trigger priority of the NPA AS is the lowest at a calling side;

It should be noted that: if the IFC of the caller subscription information contains the trigger criteria for the NPA AS, it is indicated that the caller has an NPA attribute; otherwise, it is indicated that the caller does not have the NPA attribute. Therefore, the IFC is utilized for implementing the NPA attribute of the caller, so that the NPA AS does not need to deploy caller business information, so as to improve the system processing capacity of the NPA AS.

Embodiments of the present invention further provide a computer storage medium, where the computer storage medium stores computer executable instructions, and the computer executable instructions are configured to execute the above method for implementing the NPA described in embodiments of the present invention.

Figure 2:
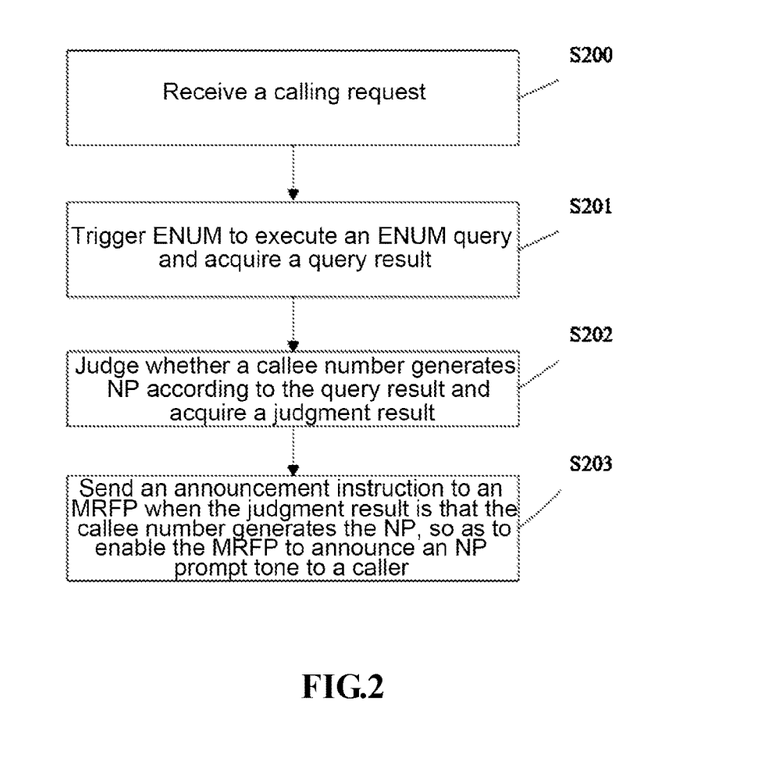
FIG. 2 is a flow chart illustrating a method for implementing NPA at an NPA AS side according to embodiments of the present invention.

FIG. 2 is a flow chart illustrating a method for implementing NPA at an NPA AS side according to embodiments of the present invention. As shown in FIG. 2, the method for implementing the NPA at the NPA AS side according to embodiments of the present invention includes:

S200: a calling request is received;

S201: ENUM is triggered to execute an ENUM query, and a query result is acquired, where the ENUM query refers to that the ENUMS queries the format of callee number information in the calling request.

Specifically, an NPA AS sends an ENUM query request to the ENUMS after receiving the calling request, and the ENUMS feeds back the query result to the NPA AS after completing the ENUM query.

Here, the query result includes: the callee number information in the calling request is in an TEL URI format or in an SIP URI format.

S202: whether a callee number generates NP is judged according to the query result, and a judgment result is acquired;

Here, when the query result is that the callee number information in the calling request is in the TEL URI format, the judging whether the callee number generates the NP according to the query result, includes: the NPA AS judges whether the callee number generates the NP according to the callee number information in the TEL URI format.

Specifically, the NPA AS extracts a network routing code and a user number section in the callee number information in the TEL URI format; and for example, the callee number information is tel: +8625 NDC SN; npdi; rn=ab, where ab represents the network routing code, and NDC represents the user number section.

Further, the NPA AS queries whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

Here, when the query result is that the callee number information in the calling request is in the SIP URI format, the judging whether the callee number generates the NP according to the query result, includes: the NPA AS judges whether the callee number generates the NP according to the callee number information in the SIP URI format.

Specifically, the NPA AS extracts a network domain name and a user number section in the callee number information in the SIP URI format; and for example, the callee number information is sip: +8625 NDC SN@example.com.cn, where example.com.cn represents the network domain name, and NDC represents the user number section.

Further, the NPA AS queries whether the network domain name is consistent with a pre-configured network domain name corresponding to the user number section in a second corresponding relationship table according to the user number section; if not consistent, it is indicated that the callee number generates the NP; and if consistent, it is indicated that the callee number does not generate the NP.

It should be noted that: the first corresponding relationship table and the second corresponding relationship table need to be pre-configured in the NPA AS, where the first corresponding relationship table refers to a corresponding relationship between the user number section and the network routing code that are pre-appointed by an operator; and the second corresponding relationship table refers to a corresponding relationship between the user number section and the network domain name that are pre-appointed by the operator.

S203: when the judgment result is that the callee number generates the NP, an announcement instruction is sent to an MRFP, so as to enable the MRFP to announce an NP prompt tone to a caller according to the announcement instruction.

Here, the NPA AS sends different announcement instructions to the MRFP according to different network types of the callee number. For example, the NP prompt tone in the announcement instruction is that the subscriber you dialed has moved a telephone to a network A if the callee number generates the NP and is carried to the network A.

Further, the method also includes: an error message is fed back to an SCSCF when the judgment result is that callee number does not generate the NP.

Here, the NPA AS feeds back the error message to the SCSCF; and the NPA AS continues subsequent calling flows, such as called routing and the like, after the SCSCF receives the error message. Therefore, the NPA AS does not need to be added into the subsequent calling flows, so as to reduce unnecessary performance expense.

Here, it should be added that: when the judgment result is that the callee number does not generate the NP, the step that the NPA AS feeds back the error message to the SCSCF is an optional operation, and specifically, the NPA AS can choose and determine whether to feed back the error message to the SCSCF by a switch control key. Further, when the NPA AS determines not to feed back the error message to the SCSCF by the switch control key, the NPA AS can feed back an INVITE session initiation request to the SCSCF, so as to enable the SCSCF to continue the subsequent calling flows after receiving the INVITE session initiation request.

Embodiments of the present invention further provide a computer storage medium, where the computer storage medium stores computer executable instructions, and the computer executable instructions are configured to execute the above method for implementing the NPA described in embodiments of the present invention.

Figure 3:
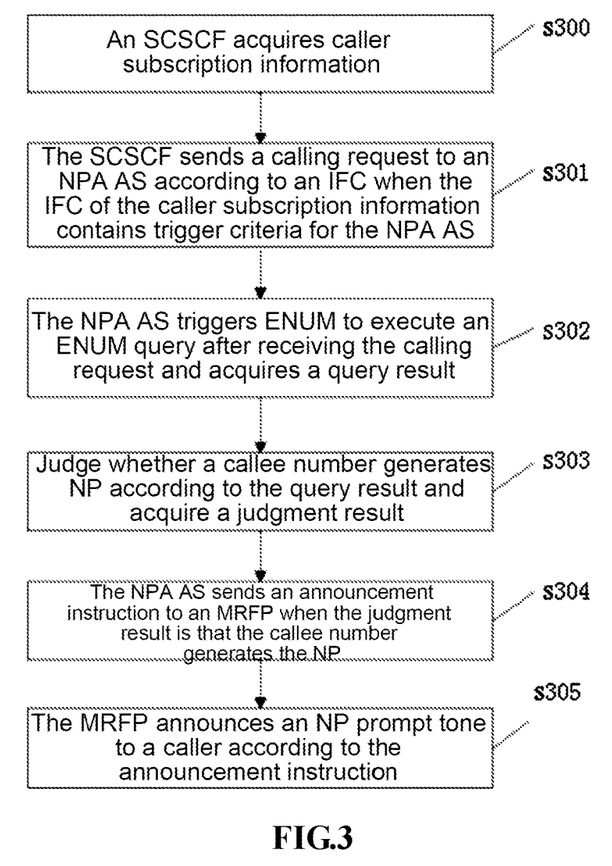
FIG. 3 is a flow chart illustrating implementation of a method for implementing NPA according to embodiments of the present invention.

FIG. 3 is a flow chart illustrating implementation of a method for implementing NPA according to embodiments of the present invention. As shown in FIG. 3, the method for implementing the NPA according to embodiments of the present invention includes:

S300: an SCSCF acquires caller subscription information;

Here, an HSS stores the caller subscription information; and accordingly, the step that the SCSCF acquires the caller subscription information includes: the SCSCF acquires the caller subscription information from the HSS by a Cx interface.

S301: the SCSCF sends a calling request to the NPA AS according to an IFC when the IFC of the caller subscription information contains trigger criteria for the NPA AS.

Here, the trigger criteria for the NPA AS include: the trigger priority of the NPA AS is the lowest at a calling side;

It should be noted that: when the IFC of the caller subscription information contains the trigger criteria for the NPA AS, it is indicated that a caller has an NPA attribute; otherwise, it is indicated that the caller does not have the NPA attribute. Therefore, the IFC is utilized for implementing the NPA attribute of the caller, so that the NPA AS does not need to deploy caller business information, so as to improve the system processing capacity of the NPA AS.

S302: the NPA AS triggers ENUM to execute an ENUM query and acquires a query result after receiving the calling request, where the ENUM query refers to that the ENUMS queries the format of callee number information in the calling request.

Specifically, the NPA AS sends the ENUM query request to the ENUMS after receiving the calling request, and the ENUMS feeds back the query result to the NPA AS after completing the ENUM query.

Here, the query result includes: the callee number information in the calling request is in an TEL URI format or in an SIP URI format.

S303: whether a callee number generates NP is judged according to the query result, and a judgment result is acquired;

Here, when the query result is that the callee number information in the query result is in the TEL URI format, the judging whether the callee number generates the NP according to the query result, includes: the NPA AS judges whether the callee number generates the NP according to the callee number information in the TEL URI format.

Specifically, the NPA AS extracts a network routing code and a user number section in the callee number information in the TEL URI format; and for example, the callee number information is tel: +8625 NDC SN; npdi; rn=ab, where ab represents the network routing code, and NDC represents the user number section.

Further, the NPA AS queries whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

Here, when the query result is that the callee number information in the calling request is in the SIP URI format, the judging whether the callee number generates the NP according to the query result, includes: the NPA AS judges whether the callee number generates the NP according to the callee number information in the SIP URI format.

Specifically, the NPA AS extracts a network domain name and a user number section in the callee number information in the SIP URI format; and for example, the callee number information is sip: +8625 NDC SN@example.com.cn, where example.com.cn represents the network domain name, and NDC represents the user number section.

Further, the NPA AS queries whether the network domain name is consistent with a pre-configured network domain name corresponding to the user number section in a second corresponding relationship table according to the user number section; if not consistent, it is indicated that the callee number generates the NP; and if consistent, it is indicated that the callee number does not generate the NP.

It should be noted that: the first corresponding relationship table and the second corresponding relationship table need to be pre-configured in the NPA AS, where the first corresponding relationship table refers to a corresponding relationship between the user number section and the network routing code that are pre-appointed by an operator; and the second corresponding relationship table refers to a corresponding relationship between the user number section and the network domain name that are pre-appointed by the operator.

S304: the NPA AS sends an announcement instruction to an MRFP when the judgment result is that the callee number generates the NP;

Here, the NPA AS sends different announcement instructions to the MRFP according to different network types of the callee number. For example, an NP prompt tone in the announcement instruction is that the subscriber you dialed has moved a telephone to a network A if the callee number generates the NP and is carried to the network A.

S305: the MRFP announces the NP prompt tone to the caller according to the announcement instruction.

Therefore, according to embodiments of the present invention, the NPA AS triggers ENUM to execute the ENUM query, and an NP judgment is carried out after the ENUM query, so as to reduce dependence between network elements.

Further, the method also includes: the NPA AS feeds back an error message to the SCSCF when the judgment result is that the callee number generates the NP; and the SCSCF continues subsequent calling flows such as called routing and the like, after receiving the error message. Therefore, the NPA AS does not need to be added into the subsequent calling flows, so as to reduce the unnecessary performance expense. It should be noted that: the IFC of the caller subscription information stored in the HSS needs to be configured to have a "SESSION-CONTINUED" manner.

Here, it should be added that: when the judgment result is that the callee number does not generate the NP, the step that the NPA AS feeds back the error message to the SCSCF is an optional operation, and specifically, the NPA AS can choose and determine whether to feed back the error message to the SCSCF by a switch control key. Further, when the NPA AS determines not to feed back the error message to the SCSCF by the switch control key, the NPA AS can feed back an INVITE session initiation request to the SCSCF, so as to enable the SCSCF to continue the subsequent calling flows after receiving the INVITE session initiation request.

Embodiments of the present invention further provide a computer storage medium, where the computer storage medium stores computer executable instructions, and the computer executable instructions are configured to execute the above method for implementing the NPA described in embodiments of the present invention.

Figure 4:
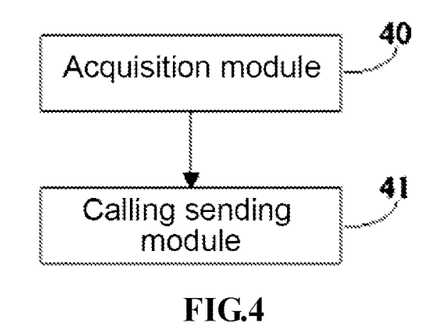
FIG. 4 is a schematic structural diagram illustrating an SCSCF according to embodiments of the present invention.

FIG. 4 is a schematic structural diagram illustrating an SCSCF according to embodiments of the present invention. As shown in FIG. 4, the SCSCF according to embodiments of the present invention includes: an acquisition module 40 and a calling sending module 41, where the acquisition module 40 is configured to acquire caller subscription information; and here, an HSS stores the caller subscription information; and accordingly, the step that the acquisition module 40 in the SCSCF acquires the caller subscription information includes: the caller subscription information is acquired from the HSS by a Cx interface.

The calling sending module 41 is configured to send a calling request according to an IFC when the IFC of the caller subscription information contains trigger criteria for an NPA AS.

Here, the sending the calling request refers to that the calling sending module 41 in the SCSCF sends the calling request to the NPA AS according to the IFC, where the trigger criteria for the NPA AS include: the trigger priority of the NPA AS is the lowest at a calling side.

It should be noted that: when the IFC of the caller subscription information contains the trigger criteria for the NPA AS, it is indicated that a caller has an NPA attribute; otherwise, it is indicated that the caller does not have the NPA attribute. Therefore, the IFC is utilized for implementing the NPA attribute of the caller, so that the NPA AS does not need to deploy caller business information, so as to improve the system processing capacity of the NPA AS.

In an actual application, the acquisition module 40 and the calling sending module 41 can be implemented by a CPU (Central Processing Unit), an MPU (Micro Processor Unit), a DSP (Digital Signal Processor) or an FPGA (Field Programmable Gate Array) that are located in the SCSCF.

Figure 5:
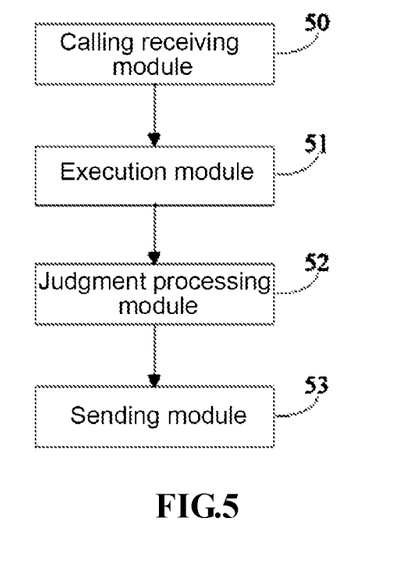
FIG. 5 is a schematic structural diagram illustrating an NPA AS according to embodiments of the present invention.

FIG. 5 is a schematic structural diagram illustrating an NPA AS according to embodiments of the present invention.

As shown in FIG. 5, the NPA AS according to embodiments of the present invention includes: a calling receiving module 50, an execution module 51, a judgment processing module 52 and a sending module 53, where the calling receiving module 50 is configured to receive a calling request;

the execution module 51 is configured to trigger ENUM to execute an ENUM query and then acquire a query result, where the ENUM query refers to that the ENUMS queries the format of callee number information in the calling request; and specifically, the execution module 51 in the NPA AS sends an ENUM query request to the ENUMS, and the ENUMS feeds back a query result to the execution module 51 after completing the ENUM query.

Here, the query result is that the callee number information in the calling request is in an TEL URI format or in an SIP URI format.

The judgment processing module 52 is configured to judge whether a callee number generates NP according to the query result and acquire a judgment result; and here, when the query result is that the callee number information in the calling request is in the TEL URI format, the judgment processing module 52 is configured to judge whether the callee number generates the NP according to the callee number information in the TEL URI format.

Figure 6:
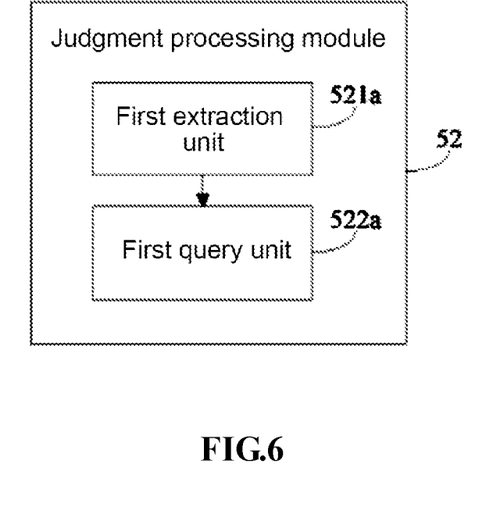
FIG. 6 is a schematic structural diagram illustrating a judgment processing module in the NPA AS according to embodiments of the present invention.

In one embodiment, as shown in FIG. 6, the judgment processing module 52 includes a first extraction unit 521a and a first query unit 522a, where the first extraction unit 521a is configured to extract a network routing code and a user number section in the callee number information in the TEL URI format; and for example, the callee number information is +8625 NDC SN; npdi; rn=ab, where ab represents the network routing code, and NDC represents the user number section.

Further, the first query unit 522a is configured to query whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

Here, when the query result is that the callee number information in the calling request is in the SIP URI format, the judgment processing module 52 is configured to judge whether the callee number generates the NP according to the callee number information in the SIP URI format.

Figure 7:
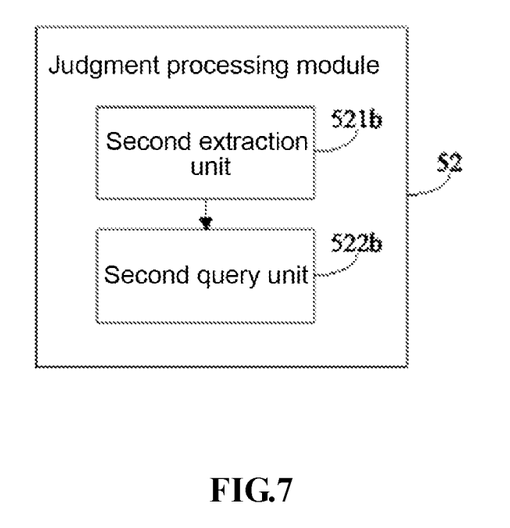
FIG. 7 is another schematic structural diagram illustrating a judgment processing module in the NPA AS according to embodiments of the present invention.

In one embodiment, as shown in FIG. 7, the judgment processing module 52 includes a second extraction unit 521b and a second query unit 522b, where the second extraction unit 521b is configured to extract a network domain name and a user number section in the callee number information in the SIP URI format; and for example, the callee number information is sip: +8625 NDC SN@example.com.cn, where example.com.cn represents the network domain name, and NDC represents the user number section.

Further, the second query unit 522b is configured to query whether the network domain name is consistent with a pre-configured network domain name corresponding to the user number section in a second corresponding relationship table according to the user number section; if not consistent, it is indicated that the callee number generates the NP; and if consistent, it is indicated that the callee number does not generate the NP.

It should be noted that: the first corresponding relationship table and the second corresponding relationship table need to be pre-configured in the NPA AS, where the first corresponding relationship table refers to a corresponding relationship between the user number section and the network routing code that are pre-appointed by an operator; and the second corresponding relationship table refers to a corresponding relationship between the user number section and the network domain name that are pre-appointed by the operator.

The sending module 53 is configured to send an announcement instruction to an MRFP when the judgment result acquired by the judgment processing module 52 is that the callee number generates the NP, so as to enable the MRFP to announce an NP prompt tone to a caller according to the announcement instruction.

Further, the sending module 53 is further configured to feed back an error message to the SCSCF when the judgment result is that the callee number does not generate the NP.

Here, the sending module 53 in the NPA AS feeds back the error message to the SCSCF; and the SCSCF continues subsequent calling flows such as called routing and the like after receiving the error message. Therefore, the NPA AS does not need to be added into the subsequent calling flows, so as to reduce the unnecessary performance expense.

Here, it should be added that: when the judgment result is that the callee number does not generate the NP, the step that the sending module 53 in the NPA AS feeds back the error message to the SCSCF is an optional operation, and specifically, the sending module 53 in the NPA AS can choose and determine whether to feed back the error message to the SCSCF by a switch control key. Further, when the sending module 53 in the NPA AS determines not to feed back the error message to the SCSCF by the switch control key, the sending module 53 can feed back an INVITE session initiation request to the SCSCF, so as to enable the SCSCF to continue the subsequent calling flows after receiving the INVITE session initiation request.

In an actual application, the calling receiving module 50, the execution module 51, the judgment processing module 52, the sending module 53, the first extraction unit 521a, the first query unit 522a, the second extraction unit 521b and the second query unit 522b are all implemented by a CPU, an MPU, a DSP or an FPGA that are located in the NPA AS.

Figure 8:
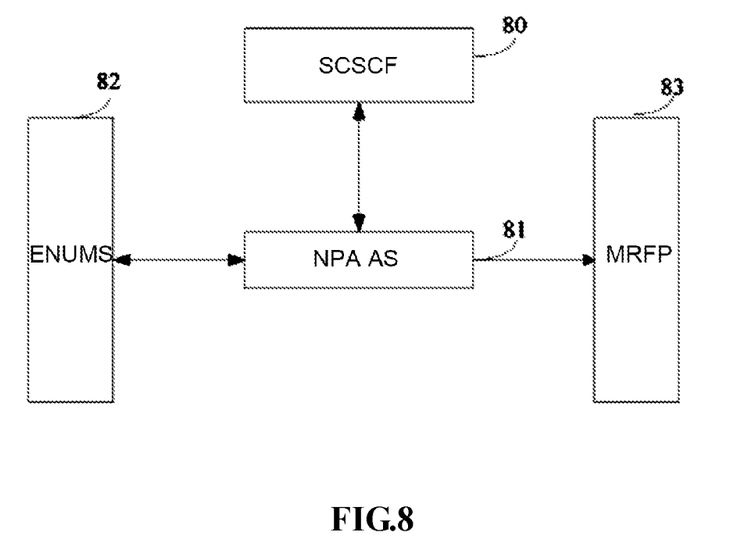
FIG. 8 is a schematic structural diagram illustrating a system for implementing NPA according to embodiments of the present invention.

FIG. 8 is a schematic structural diagram illustrating a system for implementing NPA according to embodiments of the present invention. As shown in FIG. 8, the system for implementing the NPA according to embodiments of the present invention includes: an SCSCF 80, an NPA AS 81, an ENUMS 82 and an MRFP 83, where the SCSCF 80 is configured to acquire caller subscription information; and send a calling request to the NPA AS 81 according to an IFC when the IFC of the caller subscription information contains trigger criteria for the NPA AS 81; and here, an HSS stores the caller subscription information; and accordingly, the step that the SCSCF 80 acquires the caller subscription information specifically includes: the caller subscription information is acquired from the HSS by a Cx interface.

Here, the trigger criteria for the NPA AS 81 includes: the trigger priority of the NPA AS 81 is the lowest at a calling sides.

It should be noted that: when the IFC of the caller subscription information contains the trigger criteria for the NPA AS 81, it is indicated that a caller has an NPA attribute; otherwise, it is indicated that the caller does not have the NPA attribute. Therefore, the IFC is utilized for implementing the NPA attribute of the caller, so that the NPA AS81 does not need to deploy caller business information, so as to improve the system processing capacity of the NPA AS81.

The NPA AS81 is configured to receive the calling request, trigger the ENUMS 82 to execute an ENUM query and acquire a query result; and specifically, the NPA AS81 sends an ENUM query request to the ENUMS 82, and the ENUMS 82 feeds back the query result to the NPA AS81 after completing the ENUM query.

Here, the query result is that callee number information in the calling request is in an TEL URI format or in an SIP URI format.

The NPA AS81 is configured to judge whether a callee number generates NP according to the query result and acquire a judgment result; and here, when the query result is that the callee number information in the calling request is in the TEL URI format, the NPA AS81 is configured to judge whether the callee number generates the NP according to the callee number information in the TEL URI format.

Specifically, the NPA AS81 extracts a network routing code and a user number section in the callee number information in the TEL URI format; and for example, the callee number information is tel: +8625 NDC SN; npdi; rn=ab, where ab represents the network routing code, and NDC represents the user number section.

Further, the NPA AS81 queries whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

Here, when the query result is that the callee number information in the calling request is in the SIP URI format, the NPA AS81 is configured to judge whether the callee number generates the NP according to the callee number information in the SIP URI format.

Specifically, the NPA AS81 extracts a network domain name and a user number section in the callee number information in the SIP URI format; and for example, the callee number information is sip: +8625 NDC SN@example.com.cn, where example.com.cn represents the network domain name, and NDC represents the user number section.

Further, the NPA AS81 queries whether the network domain name is consistent with a pre-configured network domain name corresponding to the user number section in a second corresponding relationship table according to the user number section; if not consistent, it is indicated that the callee number generates the NP; and if consistent, it is indicated that the callee number does not generate the NP.

It should be noted that: the first corresponding relationship table and the second corresponding relationship table need to be pre-configured in the NPA AS81, where the first corresponding relationship table refers to a corresponding relationship between the user number section and the network routing code that are pre-appointed by an operator; and the second corresponding relationship table refers to a corresponding relationship between the user number section and the network domain name that are pre-appointed by the operator.

The NPA AS81 is further configured to send an announcement instruction to the MRFP83 when the judgment result is that the callee number generates the NP; and here, the NPA AS81 can send different announcement instructions to the MRFP83 according to different network types of the callee number. For example, an NP prompt tone in the announcement instruction is that the subscriber you dialed has moved a telephone to a network A if the callee number generates the NP and is carried to the network A.

The ENUMS 82 is configured to execute the ENUM query; and the ENUM query is that the ENUMS queries the format of the callee number information in the calling request; and the MRFP83 is configured to announce the NP prompt tone to the caller according to the announcement instruction.

Therefore, according to embodiments of the present invention, the NPA AS81 triggers the ENUMS 82 to execute the ENUM query, and an NP judgment is carried out after the ENUM query, so as to reduce dependence between network elements.

Further, the NPA AS81 is further configured to feed back an error message to the SCSCF80 when the judgment result is that the callee number does not generate the NP; and the SCSCF80 is further configured to continue subsequent calling flows, such as called routing and the like, after receiving the error message. Therefore, the NPA AS81 does not need to be added into the subsequent calling flows, so as to reduce the unnecessary performance expense. It should be noted that: the IFC of the caller subscription information stored in the HSS needs to be configured to have a "SESSION-CONTINUED" manner.

Here, it should be added that: when the judgment result is that the callee number does not generate the NP, the step that the NPA AS81 feeds back the error message to the SCSCF80 is an optional operation, and specifically, the NPA AS81 can choose and determine whether to feed back the error message to the SCSCF80 by a switch control key. Further, when the NPA AS81 in the NPA AS determines not to feed back the error message to the SCSCF80 by the switch control key, the NPA AS81 can feed back an INVITE session initiation request to the SCSCF80, so as to enable the SCSCF80 to continue the subsequent calling flows after receiving the INVITE session initiation request.

Those skilled in the art should understand that: embodiments of the present invention can provide a method, an apparatus or a computer program product. Therefore, the present disclosure can adopt hardware embodiments, software embodiments or an embodiment form combining hardware and software aspects. Moreover, the present disclosure can adopt a form of the computer program product implemented on one or a more computer available storage media (including but not limited to a disk memory, an optical memory, etc.) containing computer available program codes.

The present disclosure is described with reference to the flow charts and/or block diagrams of the method, the apparatus and the computer program product of embodiments of the present invention. It should be understood that: the combination of each flow and/or each block in the flow charts and/or block diagrams and the combination of flows and/or blocks in the flow charts and/or block diagrams are implemented by computer program instructions. The computer program instructions can be provided to processors of a general-purpose computer, a special-purpose computer, an embedded processor or other programmable data processing equipments to generate a machine, so that the apparatus used for implementing functions appointed in one flow or more flows of the flow charts and/or a block or more blocks in the block diagrams is generated according to the instructions executed by the processors of the computers or other programmable data processing equipments.

The computer program instructions can also be stored in a computer readable memory which can guide the computers or other programmable data processing equipments to work in a specific manner, so that the instructions stored in the computer readable memory can generate a manufactured product including an instruction apparatus, and the instruction apparatus implements the functions appointed in one flow or more flows of the flow charts and/or a block or more blocks in the block diagrams.

The computer program instructions can also be loaded in the computers or other programmable data processing equipments, so that a series of operation steps can be executed on the computers or other programmable equipments to generate processing implemented by the computers; therefore, the instructions executed on the computers or other programmable equipments provide the steps used for implementing the functions appointed in one flow or more flows of the flow charts and/or a block or more blocks in the block diagrams.

The above descriptions are only the implementation manners of embodiments of the present invention. It should be noted that: those ordinary skilled in the art can also make several improvements and modifications on the premise of not departing from the theories of embodiments of the present invention, and the improvements and modifications should also be included in the protection scope of embodiments of the present invention.

INDUSTRIAL APPLICABILITY

According to embodiments of the present invention, the NPA AS triggers ENUM to execute the ENUM query, and the NP judgment is carried out after the ENUM query, so as to reduce independence between the network elements while effectively implementing the NPA. In addition, in embodiments of the present invention, the SCSCF triggers the NPA AS based on the IFC, rather than in a full routing manner, so as to effectively reduce the performance processing requirements of the NPA AS and the SCSCF and the complexity of route configuration of the SCSCF; and meanwhile, the IFC is utilized for implementing the NPA attribute of the caller, so that the NPA AS does not need to deploy the caller business information, so as to improve the system processing capacity of the NPA AS.

What is claimed is:

1. Method for implementing Number Portability Announcement NPA, comprising:
   receiving a calling request;
   triggering Telephone Number Mapping ENUM to execute an ENUM query and acquiring a query result;
   judging whether a callee number generates Number Portability NP according to the query result and acquiring a judgment result; and
   sending an announcement instruction to an Media Resource Function Processor MRFP when the judgment result is that the callee number generates the NP, so as to enable the MRFP to announce an NP prompt tone to a caller according to the announcement instruction.

2. The method according to claim 1, wherein the query result is that callee number information in the calling request is in a Telephone Uniform Resource Identifier TEL URI format; and
   the judging whether the callee number generates the NP according to the query result, comprises: judging whether the callee number generates the NP according to the callee number information in the TEL URI format.

3. he method according to claim 2, wherein the judging whether the callee number generates the NP according to the callee number information in the TEL URI format, comprises:
   extracting a network routing code and a user number section in the callee number information in the TEL URI format; querying whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

4. The method according to claim 3, further comprising: feeding back an error message to a Serving Call Session Control Function SCSCF when the judgment result is that the callee number does not generate the NP.

5. The method according to claim 2, further comprising: feeding back an error message to a Serving Call Session Control Function SCSCF when the judgment result is that the callee number does not generate the NP.

6. The method according to claim 1, wherein the query result is that the callee number information in the calling request is in a Session Initialization Protocol Uniform Resource Identifier SIP URI format; and
   the judging whether the callee number generates the NP according to the query result, comprises: judging whether the callee number generates the NP according to the callee number information in the SIP URI format.

7. The method according to claim 6, wherein the judging whether the callee number generates the NP according to the callee number information in the SIP URI format, comprises:
   extracting a network domain name and a user number section in the callee number information in the SIP URI format; querying whether the network domain name is consistent with a pre-configured network domain name corresponding to a user number section in a second corresponding relationship table according to the user number section; if not consistent, it is indicated that the callee number generates the NP; and if consistent, it is indicated that the callee number does not generate the NP.

8. The method according to claim 6, further comprising: feeding back an error message to a Serving Call Session Control Function SCSCF when the judgment result is that the callee number does not generate the NP.

9. The method according to claim 1, further comprising: feeding back an error message to a Serving Call Session Control Function SCSCF when the judgment result is that the callee number does not generate the NP.

10. A Number Portability Announcement Application Server NPA AS, comprising: a calling receiving module, an execution module, a judgment processing module and a sending module, wherein
   the calling receiving module is configured to receive a calling request;
   the execution module is configured to trigger Telephone Number Mapping ENUM to execute an ENUM query and acquire a query result;
   the judgment processing module is configured to judge whether a callee number generates Number Portability NP according to the query result and acquire a judgment result; and
   the sending module is configured to send an announcement instruction to a Media Resource Function Processor MRFP when the judgment result acquired by the judgment processing module is that the callee number generates the Number Portability NP, so as to enable the MRFP to announce the NP prompt tone to the caller according to the announcement instruction.

11. The NPA AS according to claim 10, wherein the query result is that the callee number information in the calling request is in a Telephone Uniform Resource Identifier TEL URI format; and the judgment processing module is configured to judge whether the callee number generates the NP according to the callee number information in the TEL URI format.

12. The NPA AS according to claim 11, wherein the judgment processing module comprises a first extraction unit and a first query unit, wherein the first extraction unit is configured to extract a network routing code and a user number section in the callee number information in the TEL URI format; and the first query unit is configured to query whether the network routing code is consistent with a pre-configured network routing code corresponding to the user number section in a first corresponding relationship table according to the user number section, if not consistent, it is indicated that the callee number generates the NP, and if consistent, it is indicated that the callee number does not generate the NP.

13. The NPA AS according to claim 12, wherein the sending module is further configured to feed back an error message to a Serving Call Session Control Function SCSCF when the judgment result acquired by the judgment processing module is that the callee number does not generate the NP.

14. The NPA AS according to claim 11, wherein the sending module is further configured to feed back an error message to a Serving Call Session Control Function SCSCF when the judgment result acquired by the judgment processing module is that the callee number does not generate the NP.

15. The NPA AS according to claim 10, wherein the query result is that the callee number information in the calling request is in a Session Initialization Protocol Uniform Resource Identifier SIP URI format; and the judgment processing module is configured to judge whether the callee number generates the NP according to the callee number information in the SIP URI format.

16. The NPA AS according to claim 15, wherein the judgment processing module comprises a second extraction unit and a second query unit, wherein the second extraction unit is configured to extract a network routing code and a user number section in the callee number information in the SIP URI format; and the second query unit is configured to query whether the network routing code is consistent with a pre-configured network routing code corresponding to a user number section in a second corresponding relationship table according to the user number section, if not consistent, it is indicated that the callee number generates the NP, and if consistent, it is indicated that the callee number does not generate the NP.

17. The NPA AS according to claim 10, wherein the sending module is further configured to feed back an error message to a Serving Call Session Control Function SCSCF when the judgment result acquired by the judgment processing module is that the callee number does not generate the NP.

18. A computer storage medium storing computer executable instructions for:

receiving a calling request;

triggering Telephone Number Mapping ENUM to execute an ENUM query and acquiring a query result;

judging whether a callee number generates Number Portability NP according to the query result and acquiring a judgment result; and sending an announcement instruction to an Media Resource Function Processor MRFP when the judgment result is that the callee number generates the NP, so as to enable the MRFP to announce an NP prompt tone to a caller according to the announcement instruction.

19. The computer storage medium according to claim 18, wherein the query result is that callee number information in the calling request is in a Telephone Uniform Resource Identifier TEL URI format; and the judging whether the callee number generates the NP according to the query result, comprises: judging whether the callee number generates the NP according to the callee number information in the TEL URI format.

20. The computer storage medium according to claim 19, wherein the judging whether the callee number generates the NP according to the callee number information in the TEL URI format, comprises:

extracting a network routing code and a user number section in the callee number information in the TEL URI format; querying whether the network routing code is consistent with a pre-configured network routing code corresponding to the user number section in a first corresponding relationship table according to the user number section; if not consistent, it is indicated that the callee number generates the NP; and if consistent, it is indicated that the callee number does not generate the NP.

* * * * *